3,707,545
HEXAKIS(DIHALOALKOXYMETHYL)
MELAMINES (TBAT)
Robert V. Berthold, South Charleston, and Rene M. J. Roberts, Charleston, W. Va., assignors to Union Carbide Corporation, New York, N.Y.
No Drawing. Filed Aug. 24, 1971, Ser. No. 174,498
Int. Cl. C07d 55/32
U.S. Cl. 260—249.6        6 Claims

ABSTRACT OF THE DISCLOSURE

Novel compounds of the following structural formula:

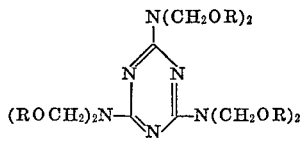

wherein R has the formula —$CH_2C_aH_bX_c$ or

—$CH_2C_6H_{5-d}X_d$ wherein X is chloro or bromo; $a$ is an integer from 1 to 8, $b$ is an integer from 0 to 16; $c$ is an integer from 1 to 8, and $d$ is an integer from 1 to 5.

---

This invention relates to melamine compounds. More particularly, the invention relates to novel hexakis(halohydrocarbyloxymethyl) melamines which are particularly suitable as flame retardants in textile fiber and plastic applications when used either alone or in combination with a wide variety of phosphorus compounds.

The compounds of the invention can be represented by the following structural formula:

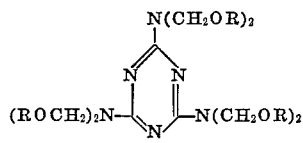

wherein R has the formula —$CH_2C_aH_bX_c$ or

—$CH_2C_6H_{5-d}X_d$ wherein X is chloro or bromo; $a$ is an integer from 1 to 8; $b$ is an integer from 0 to 16; $c$ is an integer from 1 to 8, and $d$ is an integer from 1 to 5.

Representative R groups include 2,3-dibromo-1-propyl, 1,3-dibromo-2-propyl, 2,3-dichloro-1-propyl, 1,3-dichloro-2-propyl, 3,4-dichlorobenzyl, 2-chloro-3-bromo-1-propyl, 3,4-dibromo-1-butyl, 2,4-dibromo-3-butyl, 7,8-dichloro-1-octyl, 5-bromo-1-pentyl, 4,5,6-trichloro-1-hexyl, 4,5-dibromo-6,7-dichloro-1-heptyl, 2,3,4,5-tetra-bromo-1-pentyl, 2,3,3'-trichloro-4,5-dibromo-1-hexyl, 4,5-dibromobenzyl, 6,6',5,5',4,4',3,3'-octachloro-1-heptyl, 4-bromo-1-butyl, 2,3-dibromo-4-chloro-benzyl, 5,5'-bromochloro-1-pentyl, 3-chloro-1-hexyl and the like. The preferred groups are 2,3-dibromo-1-propyl, 1,3-dibromo-2-propyl, 2,3-dichloro-1-propyl and 1,3-dichloro-2-propyl.

Compounds contemplated by the above structural formula include the following:

Hexakis(2,3-dibromo-1-propoxymethyl)melamine,
Hexakis(2,3-dichloro-1-propoxymethyl)melamine,
Hexakis(1,3-dichloro-2-propoxymethyl)melamine, and
Hexakis(1,3-dibromo-2-propoxymethyl)melamine.

In general, the novel compounds of the invention can be prepared by the acid catalized reaction of the methyl ether of hexamethylol melamine with a halo alcohol, at temperatures and for a time sufficient to produce the desired novel products.

The general reaction scheme can be illustrated by the following equation wherein the meaning of R is as above indicated:

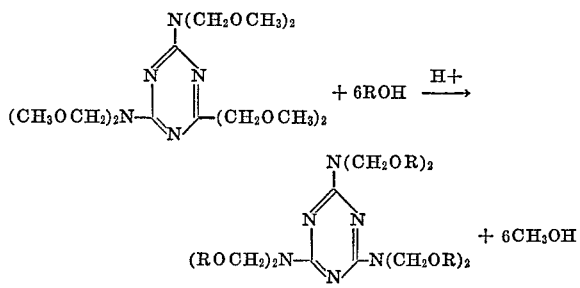

Representative alcohols useful in the present invention include
2,3-dibromo-1-propanol, 1,3-dibromo-2-propanol,
2,3-dichloro-1-propanol, 1,3-dichloro-2-propanol,
3,4-dichlorobenzyl alcohol, 2-chloro-3-bromo-1-propanol,
3,4-dibromo-1-butanol, 2,4-dibromo-3-butanol,
7,8-dichloro-1-octanol, 5-bromo-1-pentanol,
4,5,6-trichloro-1-hexanol,
4,5-dibromo-6,7-dichloro-1-heptanol,
2,3,4,5-tetrabromo-1-pentanol,
2,3,3'-trichloro-4,5-dibromo-1-hexanol,
4,5-dibromobenzyl alcohol.

The acid catalysts used in the process of the instant invention are conventional acid catalysts employed in the esterification art encompassing both organic and inorganic acid compounds. Representative examples of acid catalysts which are suitable include p-toluenesulfonic acid, hydrogen chloride, sulfonic acid, perchloric acid, benzenesulfonic acid, phosphoric acid, hydrobromic acid, hydrofluoric acid, ethanesulfonic acid, chlorosulfonic acid, dihydroxy fluoboric acid, and the like. Acid regenerated cation-exchange resins can also be used. The preferred acid catalyst is p-toluenesulfonic acid.

The catalysts are added in catalytically effective amounts. They are ordinarily added in amounts from about .1 weight percent to about 1 weight percent based upon the weight of the reaction materials.

The reaction temperature can range from about 55° C. or lower to about 150° C. or higher. It is preferred to conduct the reaction at a temperature sufficiently high enough for economic reaction kinetics but not at a temperature so high as to destroy the catalyst and inhibit the reaction.

Pressure does not appear to be specifically critical to the success of the reaction; however, it is preferred to conduct the reaction at a pressure of from about 5 mm. Hg to about 760 mm. Hg.

Depending upon the reactants employed, the reaction time may vary from a few minutes to about 3 hrs. Normally, however, the reaction is carried out for about 30 minutes to about 1.5 hrs.

The manner of mixing the reactants is not critical and the reaction can be effected in a variety of ways. Thus the haloalcohol may be simultaneously admixed together with the catalyst or alternatively the catalyst may be added to one of the reactants and thereafter the other reactant added.

The products resulting from the reaction, which appear as viscous liquids, can be separated by a variety of conventional means. Merely as illustrative, the desired product can be isolated by stripping under reduced pressures and if desired, catalyst removal can be effected by water-washing prior to stripping. The yields are generally quantitative, and are characterized by the presence of the product appearing as a light-colored syrup.

As mentioned previously, the novel compounds have utility as flame retardants in fiber and plastic applications. The textile fibers which can be treated with the novel compounds of the present invention to impart flame retardancy thereto, can be in the form of a woven or non-woven fabric composed of fibers such as those fabricated from cotton, cotton/polyester blends, cellose acetate, rayon, viscose rayon, and the various derivatives and blends of the above.

In addition, the fire retardant characteristics of the compounds of the instant invention are noteworthy for their use in polystyrene applications. The flame retardant compounds can be incorporated in either polystyrene foams or non-foam embodiments and are added in amounts ranging from about 1 weight percent to about 5 weight percent or more based upon the polystyrene.

The compounds of the instant invention can also advantageously be mixed with known phosphorus-containing compounds such as [tri(2-chloroethyl)phosphate, tri(2-ethylhexyl) phosphate, and tricresylphosphate] which serves to enhance the flame retardancy of these compounds.

The weight ratio of hexakis(halohydrocarbyloxymethyl) melamine compound to known phosphorus-containing compound can range from about 1:9 to about 9:1 with a preferred range of from about 3:7 to 7:3.

An extremely preferred flame retardant constitutes 30 percent hexakis(2,3-dibromo-1-propoxymethyl)melamine and 70 percent tricresylphosphate.

The following examples will illustrate the present invention.

EXAMPLE 1

A solution containing 42 grams of hexakis-(methoxymethyl) melamine, 142 grams of 2,3-dibromo-1-propanol, and 0.5 gram of p-toluene-sulfonic acid dissolved in 400 milliliters of toluene was stirred and heated to reflux. As the distillate was being passed through a one-foot glass-packed column, immediate formation of methanol was observed. In order to insure complete reaction, the distillate was removed at a rate of one drop per 10 drops returned. When the head temperature reached 109° C., the reaction was deemed complete, after which the reaction mixture was allowed to cool and then washed with water. This was in turn followed by a washing with a 10 percent sodium bicarbonate solution and a final washing with water. The oil layer was stripped to a residue at 75° C. under a pressure of 3 mm. Hg, which gave a quantitative yield of hexakis(2,3-dibromo-1-propoxymethyl) melamine. An infrared spectrum revealed the expected bands. Calculated for the product: Br, 63.69; N, 5.58. Found: Br, 63.78; N, 5.65.

EXAMPLE 2

A solution containing 39 grams of hexakis-(methoxymethyl)melamine, 756 grams of 2,3-dichloro-1-propanol, and 0.3 gram of p-toluene-sulfonic acid dissolved in 400 milliliters of toluene was stirred and heated to reflux. As the distillate was being passed through a one-foot glass-packed column, immediate formation of methanol was observed. In order to insure complete reaction, the distillate was removed at a rate of one drop per 10 drops returned. When the head temperature reached 109° C., the reaction was deemed complete, after which the reaction mixture was stripped to a residue at 75° C. under a pressure of 2 mm. Hg, for one hour which gave a quantitative yield of hexakis(2,3-dichloro-1-propoxymethyl)melamine. An infrared spectrum revealed the expected bands and the product was identified as hexakis(2,3-dichloro-1-propoxymethyl)melamine.

EXAMPLE 3

A solution containing 39 grams of hexakis-(methoxymethyl)melamine, 76 grams of 1,3-dichloro-2-propanol, and 0.2 gram of p-toluene-sulfonic acid dissolved in 400 milliliters of toluene was stirred and heated to reflux. As the distillate was being passed through a one-foot glass-packed column, immediate formation of methanol was observed. In order to insure complete reaction, the distillate was removed at a rate of one drop per 10 drops returned. When the head temperature reached 109° C., the reaction was deemed complete, after which the reaction mixture was stirred to a residue at 75° C. under a pressure of 3 mm. Hg, which gave a quantitative yield of hexakis(1,3-dichloro-2-propoxymethyl)melamine. An infrared spectrum revealed the expected bands and the product was identified as hexakis(1,3-dichloro-2-propoxymethyl)melamine.

EXAMPLE 4

A solution containing 29.5 grams of hexakis(methoxymethyl)melamine, 100 grams of 1,3-dibromo-2-propanol, and 0.1 gram of p-toluene-sulfonic acid dissolved in 400 milliliters of toluene was stirred and heated to reflux. As the distillate was being passed through a one-foot glass-packed column, immediate formation of methanol was observed. In order to insure complete reaction, the distillate was removed at a rate of one drop per 10 drops returned. When the head temperature reached 109° C., the reaction was deemed complete, after which the reaction mixture was stripped to a residue at 75° C. under a pressure of 3 mm. Hg, which gave a quantitative yield of hexakis(1,3-dibromo-2-propoxymethyl)melamine. An infrared spectrum revealed the expected bands and the product was identified as hexakis(1,3-dibromo-2-propoxymethyl)melamine.

EXAMPLE 5

This example is designed to show that hexakis(2,3-dibromo-1-propoxymethyl)melamine can also be made in the absence of a solvent and under reduced pressure.

A mixture of 42 grams of hexakis(methoxymethyl)melamine, 142 grams of 2,3-dibromo-1-propanol and 0.2 grams of p-toluenesulfonic acid was warmed with mechanical stirring to 45° C. at which point the mixture became a one-phase solution. At this point, the pressure was reduced to 20 mm. Hg and heating and stirring continued. A Dry Ice-acetone cooled trap had been placed between the reaction vessel and the vacuum source and at 55° C., a vigorous bubbling took place and methanol vapors condensed in the cooled trap. The bubbling began to moderate at 62° C. and at 82° C. only occasional bubbling was observed. At 85° C. and a total reaction time of 50 minutes, the reaction was terminated. In theory, the transesterification reaction was to yield 20.5 grams of methanol and, in operation, 18.5 grams of methanol were recovered. An infrared spectrum of the residue product was essentially identical to that recorded in Example 1.

EXAMPLE 6

This example is designed to show the flame retardant properties of hexakis(2,3-dibromo-1-propoxymethyl)melamine (TBAT).

A mixture of 50 grams of polystyrene, 2 grams of TBAT and 0.5 grams of dicumyl peroxide was dissolved in 500 grams of dichloromethane. The solution was evaporated to dryness and the residue expanded by heating to 50° C. under vacuum. The polystyrene foam (½ inch thick) was self-extinguishing in one second after removal from a Bunsen burner flame. A control polystyrene foam not containing TBAT and dicumyl peroxide continued to burn completely.

EXAMPLE 7

This example is designed to show the flame retardant properties of TBAT in cellulose.

A fifty percent mixture of TBAT and tri-(2-chloroethyl)-phosphate was mechanically mixed with Viscose dope. The mixture was cast into a film and exposed to a dilute aqueous acid solution for cellulose regeneration. The film was washed several times with water and then dried in an oven. The dried film was placed in a jig and the burn time was determined after ignition of the film by a match. The flame retardant mixture had been added to the Viscose in a 1:4 weight ratio which caused the cellulose film to be self-extinguishing at 45° when ignited at the bottom of the film.

What is claimed is:
1. A compound of the formula:

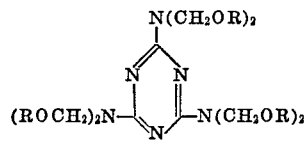

wherein R has the formula —$CH_2C_aH_6X_c$ or
—$CH_2C_6H_{5-d}X_d$ wherein X is chloro or bromo; $a$ is an integer from 1 to 8; $b$ is an integer from 0 to 16; $c$ is an integer from 1 to 8, and $d$ is an integer from 1 to 5.

2. A compound of claim 1 wherein R is selected from the group consisting of 2,3-dibromo-1-propyl, 1,3-dibromo-2-propyl, 2,3-dichloro-1-propyl and 1,3-dichloro-2-propyl.
3. Hexakis(2,3-dibromo-1-propoxymethyl)melamine.
4. Hexakis(2,3-dichloro-1-propoxymethyl)melamine.
5. Hexakis(1,3-dichloro-2-propoxymethyl)melamine.
6. Hexakis(1,3-dibromo-2-propoxymethyl)melamine.

References Cited

Eichler et al., Arzn. Forsch, vol .6, pp. 119–24 (1956); Chem. Abstr., vol. 50, col. 9622i.

JOHN M. FORD, Primary Examiner

U.S. Cl. X.R.

117—136; 252—8.1